United States Patent [19]

Umeda et al.

[11] 4,436,891

[45] Mar. 13, 1984

[54] MODIFIED POLYOXYALKYLENEPOLYAMINE CURING AGENTS FOR EPOXY RESINS

[75] Inventors: Arihiko Umeda; Yoshiyuki Iwase, both of Tokyo, Japan

[73] Assignee: Texaco Inc., White Plains, N.Y.

[21] Appl. No.: 415,059

[22] Filed: Sep. 7, 1982

[30] Foreign Application Priority Data

Sep. 14, 1981 [JP] Japan ................................. 56-144023

[51] Int. Cl.³ ............................................. C08G 59/50
[52] U.S. Cl. ..................................... 528/111; 525/409; 528/407; 564/487; 564/505
[58] Field of Search ................ 528/111, 407; 525/409; 564/487, 505

[56] References Cited

U.S. PATENT DOCUMENTS

| 3,306,809 | 2/1967 | Williamson et al. | 528/111 X |
| 3,316,185 | 4/1967 | Reinking | 528/111 |
| 3,380,881 | 4/1968 | Williamson et al. | 528/111 X |
| 3,531,527 | 9/1970 | Li et al. | 564/487 X |
| 4,179,552 | 12/1979 | Waddill | 528/111 |
| 4,362,856 | 12/1982 | Kluger | 528/111 |

*Primary Examiner*—Earl A. Nielsen
*Attorney, Agent, or Firm*—Robert A. Kulason; Robert Knox, Jr.; James J. O'Loughlin

[57] ABSTRACT

Disclosed are curing agents for epoxy resins consisting of modified polyoxyalkylenepolyamines obtained by the addition reaction of an alkyleneimine to a polyoxyalkylenepolyamine, preferably a polyoxypropylenepolyamine or polyoxyethylenepolyalkylamine, and ethyleneimine or propyleneimine in acid medium.

10 Claims, No Drawings

MODIFIED POLYOXYALKYLENEPOLYAMINE CURING AGENTS FOR EPOXY RESINS

BACKGROUND OF THE INVENTION

1. Field of the Invention

The invention relates to novel curing agents for epoxy resins, to a process for making same and to an epoxy resin curing process using such agents characterized by a faster curing speed and improved physical properties of the finished resin as compared with prior art polyoxyalkylenepolyamine curing agents.

2. Description of the Prior Art

In U.S. Pat. No. 4,115,361 polyoxyalkylenepolyamines are used as a curing agent for vicinal epoxy resin and give it good color and low viscosity. However, they may require an accelerator to speed the amine cure of the epoxy resin, especially when below room temperature.

In addition to the use of accelerators, there have been suggested a method for mixing an amine compound of high curing rate with polyoxyalkylenepolyamine and a method for providing a higher curing rate by forming an addition reaction product of formaldehyde and phenol to polyoxyalkylenepolyamine. The usual result of these attempts is that the color of the resin deteriorates and the viscosity of the curing mass becomes extremely high.

Accordingly, the main object of this invention is to provide a higher curing rate to vicinal epoxy resins. It was found that this can be accomplished without addition of accelerators or of amine compounds of higher curing rate by curing with the addition-reaction product of an alkyleneimine to an polyoxyalkylenepolyamine. In addition, it was found that the physical property of the cured resin is improved.

A method using some of alkyleneimine derivatives as curing agents for epoxy resins or as a cross-linking agent is already known and reported in British publication, "High Polymer" 24,313 (1972), and Japanese publication "Petroleum and Petrochemistry" 15 (7), 118 (1971). The reaction of alkyleneimine with polyoxyalkylenepolyamine as in this invention to form an agent capable of providing a higher curing rate for epoxy resin was never reported.

SUMMARY

In accordance with this invention, curing agents for epoxy resin are manufactured by gradually adding an alkyleneimine to an polyoxyalkylenepolyamine in the presence of an acid catalyst with agitation. They are heated as needed. In this reaction, the alkyleneimine is ring-opened and added to the polyoxyalkylenepolyamine.

The ring-opening addition reaction temperature for manufacturing the curing agent for epoxy resin of this invention ranges from room temperature (20° C.) to 250° C. But preferably, the temperature range should be from 70° C. to 150° C. The reaction time ranges from one hour to 100 hours. It is preferred the said time be from approximately 3 hours to 15 hours. For this reaction the molar ratio of polyoxyalkylenepolyamine and alkyleneimine can optionally be selected over the range from 20:1 to 1:20 and preferably should be from 5:1 to 1:5. The amount of acid catalyst used for this reaction is from approximately 0.01 weight percent to about 20 percent of the total charge quantity. It is preferred that the said value be from 0.1 weight percent to 10 weight percent.

POLYOXYALKYLENEPOLYAMINE REACTANTS

A preferred class of polyoxyalkylenepolyamines is depicted by the formula:

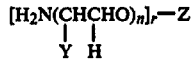

wherein Y is hydrogen, a methyl radical or or an ethyl radical; Z is a hydrocarbon radical having 2 to 5 carbon atoms forming from 2 to 4 external ether linkages; n is a number from 1 to about 15 and r is a number from 2 to 4. These polyoxyalkylenepolyamines can be prepared by known methods as disclosed in U.S. Pat. Nos. 3,236,895 and 3,654,370.

The polyoxyalkylenepolyamines used in this invention and encompassed by the above formula include polyoxypropylenediamines represented by formula (I).

$$H_2NCH(CH_3)CH_2[OCH_2CH(CH_3)]_nNH_2 \qquad (I)$$

wherein n=2–50;
bispropylamines of a polyoxyethylene represented by formula (II).

$$H_2N(CH_2)_3[O(CH_2)_2]_nO(CH_2)_3NH_2 \qquad (II)$$

wherein n=1–50; and
triamines of a polyoxypropylene is represented by the following formula (III).

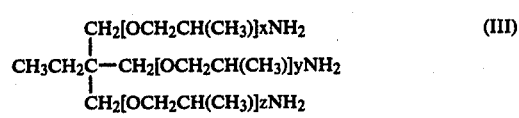

wherein x+y+z=3–10

The polyoxyalkylenepolyamines shown by the formulae (I) and (II) are preferred and compounds where n=2.6, n=5.6 and n=33.1 are preferred among the compounds of formula (I). The compound where n=2 is preferred among those of formula (II) and the compound x+y+z=5.3 is preferred among those of formula (III). The most preferred polyoxyalkylenepolyamine is a polyoxypropylene diamine having a molecular weight of about 230.

ALKYLENEIMINE REACTANTS

The alkyleneimines used in this invention include ethyleneimines and propyleneimines shown by the following formula

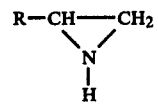

wherein R is hydrogen or $C_1$–$C_5$ lower alkyl, preferably methyl.

ACID CATALYSTS

The acid catalysts used in this invention are Brönsted acids and Lewis acids. Protic acids including both of the inorganic acids such as sulfuric acid, acetic acid, nitric acid, hydrochloric acid, phosphoric acid, and the like and organic acids such as toluenesulfonic acid, benzoic acid, phenol, are typical Brönsted acids. While Frield-Crafts catalysts of boron trifluoride and its complex, aluminum trichloride, titanium tetrachloride, are typical Lewis acids. Desirable catalysts are those which do not react with an amine compound but produce a complex. For instance, catalysts of complex of boron trifluoride-phenol complex, ethanol complex, and the like can be used.

PRODUCTS

The curing agents of this invention when polyoxypropylenediamines of the formula (I) are used as the starting material, are generically characterized by the formulas $$H_2N \sim R' \sim NHCHCH_2NH_2 \quad (IV)$$
$$\quad\quad\quad\quad\quad\quad\;|$$
$$\quad\quad\quad\quad\quad\quad\;R$$

$$H_2NCH_2CHNH \sim R' \sim NHCHCH_2NH_2 \quad (V)$$
$$\quad\quad\;|\quad\quad\quad\quad\quad\quad\quad\;|$$
$$\quad\quad\;R\quad\quad\quad\quad\quad\quad\quad\;R$$

$$H_2NCH_2CH(HNCH_2CH)_{\overline{a}}NH\; R' \sim \quad (VI)$$
$$\quad\quad\;|\quad\quad\quad\;|$$
$$\quad\quad\;R\quad\quad\quad R$$

$$NH(CHCH_2NH)_bCHCH_2NH_2 \quad (VII)$$
$$\quad\;|\quad\quad\quad\quad\;|$$
$$\quad\;R\quad\quad\quad\quad R$$

$$H_2NCH_2CH \sim R' \sim N(CHCH_2NH_2)_2 \quad (VIII)$$
$$\quad\quad\;\;|\quad\quad\quad\quad\;\;|$$
$$\quad\quad\;\;R\quad\quad\quad\quad R$$

$$(H_2NCH_2CH)_{\overline{a}}N \sim R' \sim N(CHCH_2NH_2)_2$$
$$\quad\quad\;|\quad\quad\quad\quad\quad\quad|$$
$$\quad\quad\;R\quad\quad\quad\quad\quad\quad R$$

wherein R' is polyoxyalkylene and a+b= ranges from 1 to 20 and R is hydrogen or $C_1$-$C_5$ alkyl but preferably methyl.

The amine value of the curing agent of this invention ranges from approximately 100 to 1200 KOHmg/g and can freely be changed depending on the type of polyoxyalkylenepolyamine reacted and the mol of alkyleneimine reacted. The higher the amine value, the higher the curing rate with epoxy resin.

When the amount of epoxy resin equivalent to a reactive hydrogen of modified polyoxypropyleneamine obtained by this invention is mixed with a modified polyoxypropyleneamine, the above-mentioned properties are improved, compared to unmodified polyoxyalkylenepolyamines (before modification).

The curing rate with epoxy resin at room temperature is higher. With regard to the physical property of the cured epoxy resin, improvements in thermal distortion temperature, flexural strength, flexural elasticity, compressive strength, tensile strength, Izod impact strength, Shore D-type strength and chemical resistance are obtained. The afore-mentioned physical property of the cured resin was superior to the physical property of epoxy resin cured by a mixed curing agent obtained by adding an amine curing accelerator of high reaction rate to the original polyoxyalkylenepolyamine.

As described above, the polyoxyalkylenepolyamine curing agents obtained by a modification reaction of alkyleneimine according to this invention give modified characteristics to the reaction rate with epoxy resin and the physical property of the cured resin.

EXAMPLES OF BEST MODE

The invention is illustrated in non-limiting fashion by the following Examples. In these examples, the notation "Referential Case" in the Tables signifies that the performance of the modified amine is given for reference purposes. The notation "Comparative Case" signifies that the performance of the unmodified amine is compared with that of the modified amine.

EXPERIMENTAL CASES 1-3

One mol of polyoxypropylenediamine (marketed by Mitsui-Texaco Chemicals's: Jeffamine ® under the numbers given) of the average molecular weights as shown in Table 1 was put in a round bottom flask. Then, 0.014 mol of p-toluenesulfonic acid was added, the reactants were stirred at a temperature raised to 100° C., 2 mols of ethyleneimine were dropped portionwise. After completion of the addition, the temperature was maintained for three hours. Following this process, the reactants were again stirred intermittently at room temperature for 12 hours to perform a ring-opening addition reaction. The physical properties of modified polyoxypropylenediamines thus obtained are shown in Table I together with that of the unmodified polyoxypropylenediamine (before modification reaction).

TABLE I

| | | EXPERIMENTAL CASE | | | | | |
|---|---|---|---|---|---|---|---|
| | | 1 | | 2 | | 3 | |
| | | Polyoxy-propylene-diamine D-230 | Modified polyoxy-propylene-diamine DT-230 | Polyoxy-propylene-diamine D-400 | Modified polyoxy-propylene-diamine DT-400 | Polyoxy-propylene-diamine D-2000 | Modified polyoxy-propylene-diamine DT-2000 |
| Average Molecular Weight | | 230 | 320 | 400 | 400 | 2000 | 2100 |
| Color | (G) | below 1 | 1 | 1 | 2 | 1-2 | 2-3 |
| Moisture | (wt %) | 0.10 | 0.25 | 0.13 | 0.33 | 0.10 | 0.25 |
| Viscosity | (CPS at 25° C.) | 9 | 28 | 22 | 68 | 270 | 840 |
| Reactive Hydrogen Equivalent | (g/H) | 60 | 50 | 100 | 80 | 520 | 425 |
| Amine Value | (KOH mg/g) | 466 | 633 | 280 | 380 | 54 | 74 |
| Primary Amine | (mol %) | 98.2 | 76.2 | 98.8 | 76.7 | 99.0 | 76.8 |
| Secondary + Tertiary Amines | (mol %) | 1.8 | 23.8 | 1.2 | 23.3 | 1.0 | 23.2 |
| Specific Gravity | (20/20° C.) | 0.95 | 1.00 | 0.97 | 1.00 | 1.00 | 1.00 |

EXPERIMENTAL CASE 4

One mol (400 g) of polyoxypropylenetriamine of average molecular weight 400 (marketed under the name Jeffamine ®T-403) was used instead of one mol of polyoxypropylenediamine (Jeffamine ®D-230) of average molecular weight 230. In addition, 3 mols of ethyleneimine were used and experimental case 1 was repeated. The physical properties of the modified polyoxypropylenetriamine thus obtained are shown in Table 2 for comparison with unmodified polyoxypropylenetriamine (before modification).

TABLE 2

|  |  | EXPERIMENTAL CASE 4 | |
|---|---|---|---|
|  |  | Polyoxy-propylene-triamine T-430 | Modified polyoxy-propylene-triamine TT-403 |
| Average Molecular Weight |  | 400 | 530 |
| Color | (G) | 1 | 2 |
| Moisture | (wt %) | 0.08 | 0.25 |
| Viscosity | (CPS at 25° C.) | 55 | 265 |
| Reactive Hydrogen Equivalent | (g/H) | 80 | 66 |
| Amine Value | (KOH mg/g) | 350 | 487 |
| Primary Amine | (mol %) | 95.5 | 78.4 |
| Secondary + Tertiary Amine | (mol %) | 4.5 | 21.6 |
| Specific Gravity | (20/20° C.) | 0.98 | 1.00 |

REFERENTIAL CASES 1 TO 4

Comparative Referential Cases 1 to 4

Active hydrogen equivalent of modified polyoxypropylenepolyamine (DT-230, DT-400, DT-2000, TT-403) of Experimental Cases 1 to 4 and the epoxy equivalent of an epoxy resin (epoxy equivalent 190, viscosity 13,000 CPS at 25° C.) were mixed, so that the total quantity amounted to 100 g. Then their gelation time was measured at 25° C. In addition, the said mixture was subjected to the mentioned temperature for seven days. Then the physical property of the cured resin was examined. The chemical resistance of the said mixture was checked on after 7 days immersion in solvents such as indicated in Table 3 at 20° C.

For comparison with the afore-mentioned results, polyoxypropylenediamine (D-230) of average molecular weight 230 and polyoxypropylenetriamine (T-403) of average molecular weight 400 was used instead of modified polyoxypropylenepolyamine used in Experimental Cases 1 and 4. In addition, a mixed curing agent of each of the afore-mentioned two polyoxypropylenediamine (D-230) and polyoxypropylenetriamine (T-403) with amine curing accelerator AC-398 (manufactured by Texaco Inc. (US)) was also used. Except for these, the same experimental procedures as the experimental case 1 were repeated to examine gelation time, the physical properties of cured resin and chemical resistance. The results are tabulated in Tables 3 and 3A. Table 3 shows for comparison purposes the curing properties of the unmodified amines "Jeffamines" and modified amines of this invention and the performances of the materials cured by these amines, respectively.

Table 3A shows the curing properties of the amines of this invention as curing agents for epoxy resins and the performance of a cured material as reference.

TABLE 3

|  | Test Method | Referential Case 1 DT-230 | Referential Case 2 DT-400 | Referential Case 3 DT-2000 | Referential Case 4 TT-403 |
|---|---|---|---|---|---|
| Compounded amount against epoxy resin (weight part) | — | 25 | 40 | 220 | 33 |
| Gelation time (mm) | 100 g | 95 | 210 | 350 | 120 |
| Physical Property of Cured Resin |  |  |  |  |  |
| Thermal distortion (C.°) | 0.5 in × in × 100 mm 625 g | 54 | 48 | — | 54 |
| Flexural strength (Kg/mm²) | cross head speed = 2 mm/min JIS K-6911 | 9.7 | 8.4 | 4.7 | 10.9 |
| Flexural elasticity (Kg/mm²) | JIS K-6911 | 391 | 298 | 25 | 350 |
| Compressive strength (Kg/mm²) | cross head speak = 1 mm/min JIS K-6911 | 10.7 | 8.7 | — | 10.3 |
| Tensile strength (Kg/mm²) | cross head speed = 5 mm/min | 6.6 | 6.5 | 2.2 | 7.7 |
| Izod impact strength (Kg · cm/cm) | JIS K-6911 | 3.8 | 3.4 | 34.2 | 4.6 |
| Shore D-type strength | JIS K-6911 | 86 | 82 | 70 | 86 |
| Chemical Resistance |  |  |  |  |  |
| Water absorbing rate (wt %) | JIS K-7114 | 0.5 | 0.6 | — | 0.4 |
| 10% aq. NaOH (wt %) | JIS K-7114 | 0.4 | 0.5 | — | 0.3 |
| 10% aq. $H_2SO_4$ (wt %) | JIS K-7114 | 2.4 | 2.3 | — | 2.0 |
| 5% aq. $HNO_3$ (wt %) | JIS K-7114 | 0.8 | 0.9 | — | 0.8 |
| 5% aq. acetic acid (wt %) | JIS K-7114 | 21.6 | 2.0 | — | 15.6 |

TABLE 3A

| | | Refer to Referential | | | |
|---|---|---|---|---|---|
| | Test Method | Case 1 Comparative Case 1 D-230 | Case 2 Comparative Case 2 T-400 | Case 3 Comparative Case 3 D-230/AC-398 | Case 4 Comparative Case 4 T-403/AC-398 |
| Compounded amount against epoxy resin (weight part) | | 35 | 40 | 25/10 | 30/10 |
| Gelation time (mm) | 250 | 420 | 100 | 140 | |
| Physical Property of Cured Resin | | | | | |
| Thermal distortion (C.°) | 0.5 in × 0.5 in × 100 mm 625 g | 43 | 45 | 49 | 52 |
| Flexural strength (Kg/mm²) | cross head speed = 2 mm/min JIS K-6911 | 5.0 | 8.4 | 6.2 | 9.8 |
| Flexural elasticity (Kg/mm²) | JIS K-6911 | 280 | 293 | 360 | 343 |
| Compressive strength (Kg/mm²) | cross head speak = 1 mm/min JIS K-6911 | 7.6 | 8.3 | 8.8 | 9.6 |
| Tensile strength (Kg/mm²) | cross head speed = 5 mm/min JIS K-6911 | 4.5 | 5.8 | 6.0 | 7.0 |
| Izod impact strength (Kg · cm/cm) | JIS K-6911 | 1.8 | 2.1 | 1.9 | 2.8 |
| Shore D-type strength | JIS K-6911 | 73 | 77 | 80 | 83 |
| Chemical Resistance | | | | | |
| Water absorbing rate (wt %) | JIS K-7114 | 1.0 | 0.8 | 0.7 | 0.6 |
| 10% aq. NaOH (wt %) | JIS K-7114 | 0.7 | 0.6 | 0.5 | 0.5 |

EXPERIMENTAL CASE 5

Instead of polyoxypropylenediamine of the average molecular weight 230, polyoxyethylenebispropylamine of the same average molecular weight was used. Except for this, the same procedures as in experimental case 1 were repeated. The physical properties of modified polyoxyethylenebispropylamine (ET-230) thus obtained is as shown in Table 4.

TABLE 4

| | EXPERIMENTAL CASE 5 ET-230 |
|---|---|
| Average Molecular Weight | 310 |
| Color (G) | 1 |
| Moisture (wt %) | 0.30 |
| Viscosity (CPS at 25° C.) | 27 |
| Reactive Hydrogen Equivalent (g/H) | 50 |
| Amine Value (KOH mg/g) | 640 |
| Primary Amine (mol %) | 77.1 |
| Secondary + Tertiary Amine (mol %) | 22.9 |
| Specific Gravity (20/20° C.) | 1.00 |

EXPERIMENTAL CASE

Instead of p-toluenesulfonic acid, boron trifluoride-phenol complex was added to one mol of polyoxypropylenediamine (D-230) of average molecular weight 230. In addition, to this mixture, propyleneimine was added instead of ethyleneimine. Except for this, the same procedures as the experimental case 1 were repeated. The physical property of modified polyoxypropylenediamine (DP-230) thus obtained is shown as in Table 5.

TABLE 5

| | EXPERIMENTAL CASE 6 DP-230 |
|---|---|
| Average Molecular Weight | 340 |
| Color (G) | 1 |

TABLE 5-continued

| | EXPERIMENTAL CASE 6 DP-230 |
|---|---|
| Average Molecular Weight | 340 |
| Moisture (wt %) | 0.24 |
| Viscosity (CPS at 25° C.) | 30 |
| Reactive Hydrogen Equivalent (g/H) | 55 |
| Amine Value (KOH mg/g) | 510 |
| Primary Amine (mol %) | 75.6 |
| Secondary + Tertiary Amine (mol %) | 24.4 |
| Specific Gravity (20/20° C.) | 1.00 |

EXPERIMENTAL CASE 7

Instead of polyoxypropylenediamine (D-230) of average molecular weight 230, polyoxypropylenetriamine (T-403) of average molecurlar weight 400 was used. Except for this, the same procedures as in experimental case 6 were repeated. The physical properties of modified polyoxypropylenetriamine (TP-403) thus obtained is as shown in Table 6.

TABLE 6

| | EXPERIMENTAL CASE 7 TP-403 |
|---|---|
| Average Molecular Weight | 570 |
| Color (G) | 2 |
| Moisture (wt %) | 0.23 |
| Viscosity (CPS at 25° C.) | 261 |
| Reactive Hydrogen Equivalent (g/H) | 71 |
| Amine Value (KOH mg/g) | 420 |
| Primary Amine (mol %) | 77.9 |
| Secondary + Tertiary Amine (mol %) | 22.1 |
| Specific Gravity (20/20° C.) | 1.00 |

REFERENTIAL CASES 5 TO 7

After combining a reactive hydrogen equivalent of modified polyoxyalkylenepolyamine obtained in experimental cases 5 to 7 and an epoxy equivalent of epoxy resin (epoxy equivalent 190, viscosity 13,000 CPS at 25° C.), the combined amount was cured. Then the physical property of cured resin and the chemical resistance were examined according to the referential case 1. The results are as shown in Table 7.

TABLE 7

|  | Test Method | Referential Case 5 ET-230 | Referential Case 6 DP-230 | Referential Case 7 TP-403 |
| --- | --- | --- | --- | --- |
| Compounded amount against epoxy resin (weight part) | — | 25 | 28 | 35 |
| Gelation time (mm) | 100 g | 94 | 95 | 120 |
| Physical Property of Cured Resin | Same as TABLE 3 | | | |
| Thermal distortion (C. °) | 55 | 53/54 | | |
| Flexural strength (Kg/mm$^2$) | | 9.8 | 9.7 | 11.1 |
| Flexural elasticity (Kg/mm$^2$) | | 390 | 391 | 352 |
| Compressive strength (Kg/mm$^2$) | | 10.6 | 10.8 | 10.2 |
| Tensile strength (Kg/mm$^2$) | | 6.7 | 6.7 | 7.4 |
| Izod impact strength (Kg · cm/cm) | | 3.9 | 3.8 | 4.7 |
| Shore D-type strength | | 86 | 85 | 86 |
| Chemical Resistance | | | | |
| Water absorbing rate (wt %) | Same as TABLE 3 | 0.6 | 0.5 | 0.3 |
| 10% aq. NaOH (wt %) | | 0.4 | 0.4 | 0.3 |
| 10% aq. H$_2$SO$_4$ (wt %) | | 2.5 | 2.3 | 2.0 |
| 5% aq. HNO$_3$ (wt %) | | 0.9 | 0.8 | 0.8 |
| 5% aq. acetic acid (wt %) | | 22.0 | 21.5 | 15.3 |

The epoxy resins curable by the curing agents of this invention are described in U.S. Pat. No. 4,115,361 which is hereby incorporated by reference herein.

Generally, the vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituent besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis (4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensation of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The curing process of the invention involves treating one of the above vicinal epoxy resins with an effective curing amount of the present curing agents under curing conditions. In curing epoxy resins with the curing agent of the invention, accelerators described in U.S. Pat. No. 4,115,361 optionally may be used, such as one comprising 1 to 5 parts by weight per one hundred parts by weight of the resin of a piperazine/alkanolamine mixture on a weight ratio of about 1:8 and about 1:1 piperazine to alkanolamine. The above amount of accelerator is mixed with the present curing agent in amounts of 10 to 50 parts by weight of accelerator to 100 parts by weight of curing agent. Generally, the mixture of epoxy resins curing agent and accelerator, if used, is allowed to self cure at ambient temperatures and up to about 135° C.

What we claim is:

1. A curing agent for vicinal epoxy resins having an average of at least 1.8 reactive 1,2-epoxy groups per molecule comprising the reaction product of an alkyleneimine of the formula:

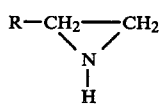

wherein R is hydrogen or $C_1$–$C_5$ alkyl with a polyoxyalkylenepolyamine, wherein the curing agent is defined by the formulas:

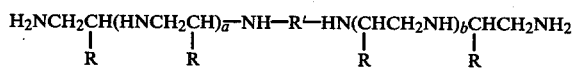

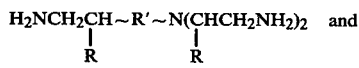

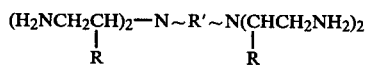

wherein R' is polyoxyalkylene, a+b ranges from 1 to 20 and R is hydrogen or $C_1$–$C_5$ alkyl.

2. The curing agent of claim 1, having an amine value ranging from 100 to 1200 KOH mg/g.

3. The process which comprises reacting a polyoxyalkylenepolyamine and an alkyleneimine of the formula

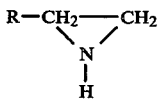

wherein R is hydrogen or $C_1$–$C_5$ alkyl in a molar ratio ranging from 20:1 to 1:20 in the presence of 0.01 to 20.0 weight percent of a Bronsted or Lewis acid which does not react with said amine at a temperature ranging from 20° C. to 250° C. for 1 to 100 hours.

4. The process of claim 3 wherein said polyoxyalkylenepolyamine has the formula

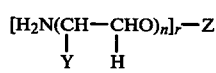

wherein Y is hydrogen, methyl or ethyl, Z is a hydrocarbon radical having 2 to 5 carbons forming 2 to 4 external ether linkages, n is 1 to 15 and r is 2 to 4.

5. The process of claim 4 wherein said polyoxyalkylenepolyamine is a polyoxypropylenediamine represented by:

wherein n=2–50;

a bispropylamine of a polyoxyethylene represented by:

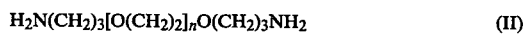

wherein n=1–50; or, a triamine of a polyoxypropylene is represented by the formula:

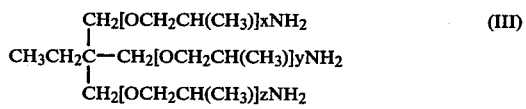

wherein x+y+z=3–10.

6. The process of claim 5 wherein n in Formulas I or II is 2.6, 5.6 or 33.1.

7. The process of claim 5, wherein n in Formula II is 2.

8. The process of claim 5, wherein x+y+z in Formula III is 5.3.

9. The process of claims 3 or 4 wherein said molar ratio of polyoxyalkylenepolyamine and alkyleneimine ranges from 5:1 to 1:5 and the amount of said catalyst ranges from 0.1 weight percent to 10.0 weight percent.

10. A process for curing a vicinal epoxy resin having an average of at least 1.8 reactive 1,2-epoxy groups per molecule comprising treating said resin under curing conditions with an effective curing amount of a curing agent according to claim 1.

* * * * *